United States Patent Office 3,487,788
Patented Jan. 6, 1970

3,487,788
HYDRAULIC UNIT
Jean Thoma, Bellevueweg 23, Zug, Switzerland, and Renzo Galdabini, Via Ivrea 1, Gallarate, Italy
Continuation of application Ser. No. 623,357, Mar. 15, 1967. This application Feb. 25, 1969, Ser. No. 804,362
Int. Cl. F04b 1/10, 1/20
U.S. Cl. 103—162          5 Claims

ABSTRACT OF THE DISCLOSURE

A bearing face on the distributor block of a rotary wobble-plate operated multi-piston rotating cylinder block pump or motor having a broad bearing land radially outwardly of the kidney-shaped ports, U-shaped oil grooves outwardly of the ports with the ends at a lesser radial distance from the axis of the rotating cylinder block than the remainder of the groove, the bearing face of the rotating cylinder block being provided with bores extending from its surface against the valve plate into the cylinders positioned radially to pass over the ends of the U-shaped oil groove; also unloading recesses circumferentially beyond the ends of the U-shaped oil grooves formed in the distribution block and blind bores in the bearing face of the cylinder block to temporarily receive dirt particles from the U-shaped oil grooves.

---

Figure 1:
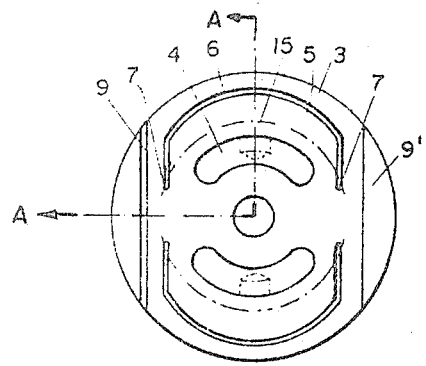

This application is a continuation of application 623,357, filed Mar. 15, 1967, now abandoned.

This invention relates to the thrust bearing between the rotating cylinder block and the non-rotating distributor or valve plate of the well known axial piston machines, such as seen in Patent No. 3,188,972. The longitudinal or axial forces between cylinder block and distributor with the kidney-shaped distribution ports with the surrounding sealing lands are transmitted partly by the fluid pressure on said ports and lands and partly by a thrust bearing provided for this purpose. The thrust bearing maintains the cylinder block always within a very small distance from the distributor in order to avoid friction losses and wear.

Ball or roller thrust bearings have been used to carry this load but have the disadvantage of difficult load capacity. Another known design uses a circular draining groove around the kidney-shaped distribution ports in the sealing lands. Outside of this groove there is provided in such known designs a separate thrust bearing with recesses fed by pressure or by a circular groove. A third known design uses a disposition of the thrust bearing without a draining groove with pressure areas of oil distribution grooves on the sealing land. Such a device is seen in Patent No. 3,188,972.

Pressure areas within circumferentially limited surfaces are generally very sensitive to dirt particles contained in the oil. The dirt particles have a tendency to be squeezed against the sealing lands at the ends of the recesses in the circumferential direction and lead to wear at that point. The known circular distribution groove has the disadvantage that it establishes a short circuit for oil between the high and the low pressure side of such an axial piston machine with a consequent leakage loss.

The object of the present invention is to design and improve the thrust bearing of such a machine by placing the bearing surfaces radially beyond the distribution ports on the sealing land which is suitably enlarged and providing proper balance action for this area.

An oil distribution groove is provided over a part only of the circumference of the stationary element, generally in the form of an arc, thus avoiding a short circuit to the low pressure side. The proposed distribution groove runs only approximately along a circumference, and the ends of the groove are nearer to the axis of revolution of the cylinder block, that is, they are placed on a smaller radius than the remainder of the groove. Due to the centrifugal forces, the dirt particles will remain within the portion on the larger radius and are therefore not squeezed between the sealing lands at the end of the distributing groove. It is preferred that no part of the distributing groove include a larger angle than about 45° with the tangent at any radius. With any larger angle there would be a danger of drawing the dirt particles into the sealing land from that part of the distribution groove. Using this principle, the exact form of the distributing groove is immaterial and it can be, according to manufacturing processes, of circular, elliptic or more complicated form. The cross section of the distributing groove is preferably of a size to permit a suitable flow of oil to the different parts of the sealing lands. If the hydraulic device is designed to be placed with the valve or distribution plate upwardly of the cylinder block, the groove could be located in the face of the cylinder block.

The distribution groove may be fed with high pressure oil by suitable bores in the cylinder block connecting to the cylinders. Preferably the openings of said bores are disposed at such a radial distance from the axes of rotation that they connect with the distributing groove only during part of the rotation. This is possible because, according to the present invention, the different parts of the distributing groove are placed at different radial distances from the axis of rotation as described above. In this way an intermittent feeding of oil into the oil distributing groove is obtained.

Another improvement according to the present invention provides further recesses or unloading grooves positioned symmetrically between the distribution ports. These grooves interrupt the exterior part of the sealing land and allow for exchange and cooling of the oil.

A further improvement consists in forming in the cylinder block a number of blind holes, on the same radius as the central part of the oil distributing groove, that is, on the part having the greatest distance from the axis of rotation. The blind holes are therefore alternately in connection with the oil distributing groove and with the unloading recesses. Any dirt particles in the center of the oil distributing groove will enter the blind holes under pressure and will be blown out due to the expansion of the oil when the blind hole passes over the unloading recesses. This feature increases the dirt tolerance of the hydrostatic bearing.

Figure 2:
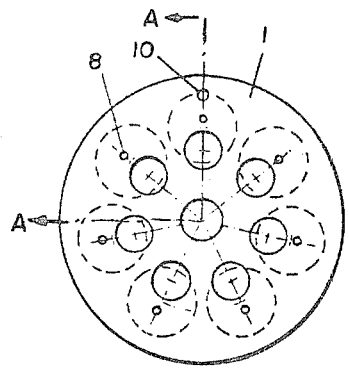
Figure 3:
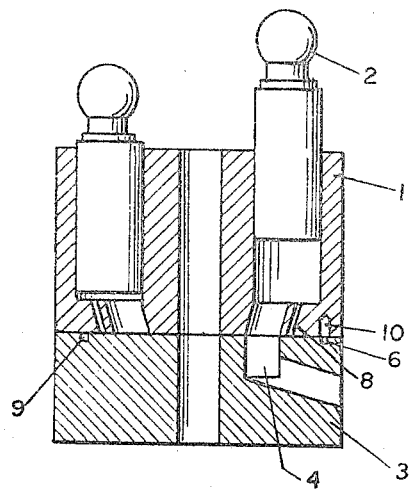

In the attached drawing:

FIGURE 1 is a view of the face of the distribution plate or valve plate of an axial piston hydraulic unit incorporating the present invention, FIGURE 2 is a view of the face of the cylinder block of the same unit that is to be in contact with the surface of the valve plate of FIGURE 1, and FIGURE 3 is a sectional view of the valve plate with the cylinder block in position thereon taken on line A—A of FIGURES 1 and 2.

For details of the mechanism for rotating the cylinder block 1 and reciprocating pistons 2, reference is made to Patent No. 3,188,972, FIGURE 1.

In the drawings, 1 refers to the rotating cylinder block, 2 refers to the pistons which are put into reciprocating movement by known means, not shown, such as a swash plate. Numeral 3 is the distributor or valve block with the kidney-shaped distribution ports 4 for the admission and delivery of the pressure fluid, as is well known.

Essential for the present invention is the form of the external sealing land 5 with the distributing channel or groove 6 having its ends 7 at a smaller distance from the axis of rotation of the cylnider block than the central part thereof.

The bores or ancillary ports 8, positioned outwardly of the ports 4 in the cylinder block, feed high pressure oil to the distributing groove 6 from the cylinders. The opening of these bores on the sealing land are placed on such a radius, as indicated by the dot-dash line in FIGURE 1, that they are intermittently in communication with the distributing groove 6 as the cylinder block 1 rotates. Such communication between bores 8 and groove 6 is preferably established near the ends 7 of the distributing groove 6, as shown in FIGURE 1. This feature ensures intermittent feeding of oil from the cylinders under pressure into the distributing groove 6. The cross section of the distributing groove preferably is of such a size as to provide an appreciable pressure loss for the oil flowing towards the center portion of the distributing groove at its position of greatest radial distance from the axis of rotation.

Furthermore, there are, in this example, unloading recesses or grooves 9, milled in the distributor face symmetrically about the plane lying between the distribution ports 4. Due to the rotation of the cylinder block a part of its valve face having a large radius is always passing over the unloading recesses 9. Therefore, any hot oil will be rinsed away and replaced by fresh and cool oil. The unloading recesses preferably have the form of a groove as represented, or the entire remaining portion in the form of a crescent may be milled away. Finally, it is possible to apply on the valve face of the cylinder block a number of blind holes 10 at such a radial position that they, due to the rotation of the cylinder block, pass over the distributing groove 6 and are intermittently open to the unloading recesses 9. The dirt particles which collect together with the pressure oil in the distributing groove 6 will be entrained in the blind holes 10 and will be washed away when passing over the unloading recesses.

The thrust bearing of an axial piston machine according to this invention gives a great tolerance to contamination in the oil and great resistance to overheating, even with high sliding velocities, and therefore represents an important step forward in the art.

What is claimed is:

1. In a hydraulic unit of the wobble plate type including a casing, a cylinder block mounted for rotation within the casing, said cylinder block having a plurality of axially extending bores therein each defining a working cylinder, a working piston within each bore, said cylinder block including a base having ports therein in communication with the respective working cylinders, said base having a planar outer surface, a valve plate fixedly mounted within the casing and having a planar surface facing and engaging the planar surface of the base of the cylinder block, and said valve plate having passageways therethrough including segmentally shaped admission and delivery ports in the planar surface of the valve plate adapted to register with successive ports in the base of the cylinder block upon relative rotation between the cylinder block and valve plate, the improvement comprising said facing surface of said valve plate having at least one generally C-shaped oil distributing groove therein open toward the base of said cylinder block, said groove having a central portion and end portions, said end portions being located at a lesser radial distance from the axis of rotation of said cylinder block than the central portion of said groove, said end portions also being located near the opposite ends of one of said segmentally shaped admission and delivery ports so that the end portions of said C-shaped groove sweep at an angle across radii of said cylinder block upon said relative rotation, said facing surface of said valve plate being uninterruped between said central portion of said distributing groove and the adjacent admission and delivery port, ancillary ports extending from each cylinder of said cylinder block an terminating in an opening in the planar face of said cylinder block and said openings of said ancillary ports being located on radii of said cylinder block at a position such that upon relative rotation between said cylinder block and valve plate they sweep past and momentarily communicate with only portions of said groove adjacent the ends thereof that lie at said lesser radial distance.

2. The hydraulic unit of claim 1 including also at least one unloading groove recess intersecting the periphery of said valve plate formed in the planar surface thereof and so positioned that a major portion of the planar surface of said rotatable cylinder block that lies radially outwardly of said ports will pass over said recess, whereby oil heated by friction between said planar surfaces of said cylinder block and said valve plate will be discharged into said unloading recess to be replaced by cooler oil via said ancillary ports and said distributing channel.

3. The hydraulic unit of claim 2 in which at least one blind bore is provided in said cylinder block at a radial distance from its axis of rotation as to pass over said C-shaped oil distributing groove at its central portion radially most remote from the axis of rotation and so as to pass over said unloading recess, whereby dirt in the oil will be entrained in said blind bore as it passes over said distributing groove and will be discharged from said bore as it passes over said unloading recess.

4. The hydraulic unit of claim 1 in which said distributing groove in said planar face of said valve plate lies at an acute angle to a tangent at any radial distance from the axis of rotation of the cylinder block.

5. The hydraulic unit of claim 1 in which two said distributing grooves are provided, each having its ends adjacent a corresponding distribution port in said valve plate.

References Cited

UNITED STATES PATENTS

| 2,155,455 | 4/1939 | Thoma | 103—162 |
| 2,972,962 | 2/1961 | Douglas | 103—162 |
| 3,040,672 | 6/1962 | Foerster et al. | 103—162 |
| 3,181,476 | 5/1965 | Matthews | 103—162 |
| 3,190,231 | 6/1965 | Thoma | 103—162 |
| 3,232,239 | 1/1966 | Jonkers et al. | 103—162 |

FOREIGN PATENTS

| 968,651 | 6/1958 | Germany. |

WILLIAM L. FREEH, Primary Examiner